April 30, 1929.  P. I. HOLLMAN  1,711,201
KITCHEN HEATER
Filed Feb. 20, 1926  2 Sheets-Sheet 1

Inventor:
Peter I. Hollman
By Wilson & McCanna
Attys.

April 30, 1929.  P. I. HOLLMAN  1,711,201
KITCHEN HEATER
Filed Feb. 20, 1926  2 Sheets-Sheet 2
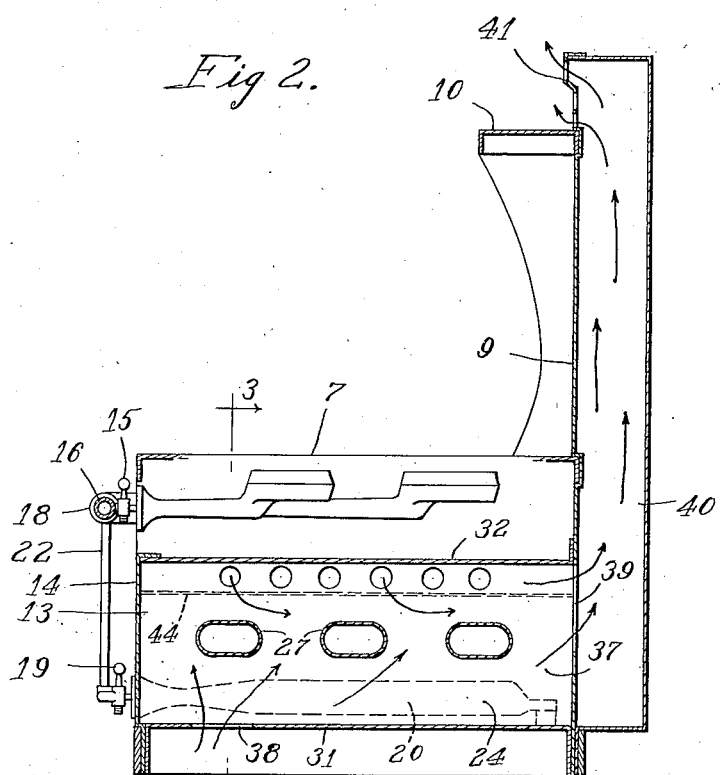
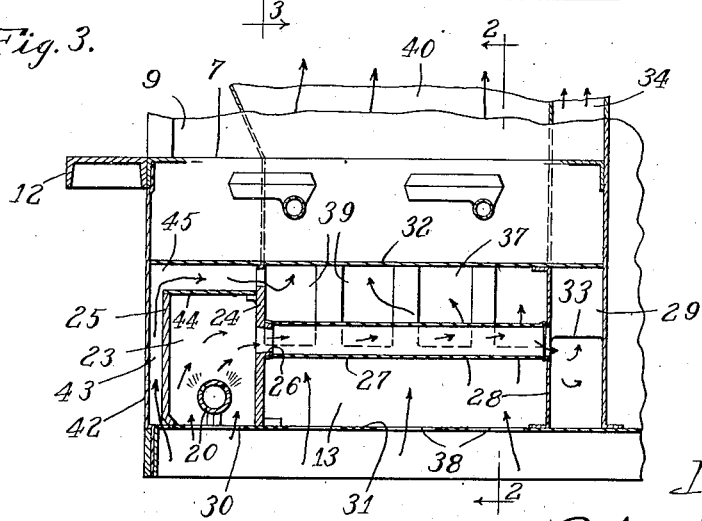
Inventor.
Peter I. Hollman
By Wilson & McCanna
Attys.

Patented Apr. 30, 1929.

1,711,201

UNITED STATES PATENT OFFICE.

PETER I. HOLLMAN, OF ROCKFORD, ILLINOIS, ASSIGNOR TO GEO. D. ROPER CORPORATION, OF ROCKFORD, ILLINOIS, A CORPORATION OF ILLINOIS.

KITCHEN HEATER.

Application filed February 20, 1926. Serial No. 89,521.

This invention relates generally to heaters and is especially concerned with the provision of a novel type of kitchen heater forming a built-in feature of a cooking stove in such a manner as not to necessitate an increase of the overall length of the stove or detract in any way from its neat and ornamental appearance.

It has been a common practice to light the oven burners of gas stoves to furnish heat in the kitchen in the early morning to take out the chill before the furnace or other regular means of heating is under way comfortably. This imposed a duty on the ovens for which they were not designed and the products of combustion were not conducted away properly and were offensive as well as unhealthy. According to the present invention, the heater feature incorporated in the stove permits the use of the stove for the purpose referred to without giving off any of the objectionable fumes and with an added advantage that the heating is done much more efficiently and also more quickly because of an induced circulation of the air produced by the manner of taking in cold, fresh air and delivering heated air.

Other advantages of the invention that may be enumerated are that the heating is not too intense but comfortable and there is no fire hazard or danger of scorching the clothing as was the case with certain other types of gas heaters offered for a similar purpose. Furthermore, the added cost involved by the installation of the heater feature according to the invention is less than that incurred by other built-in heaters or separate accessory devices.

The invention is more fully described in the following specification which refers to the accompanying drawings, wherein—

Fig. 2 is a vertical cross-section taken on the line 2—2 of Fig. 3 looking in the direction of the arrows, and Fig. 3 is a longitudinal vertical section taken on the line 3—3 of Fig. 2 looking in the direction indicated by the arrows.

The same reference numerals are applied to corresponding parts in the three views.

Figure 1:
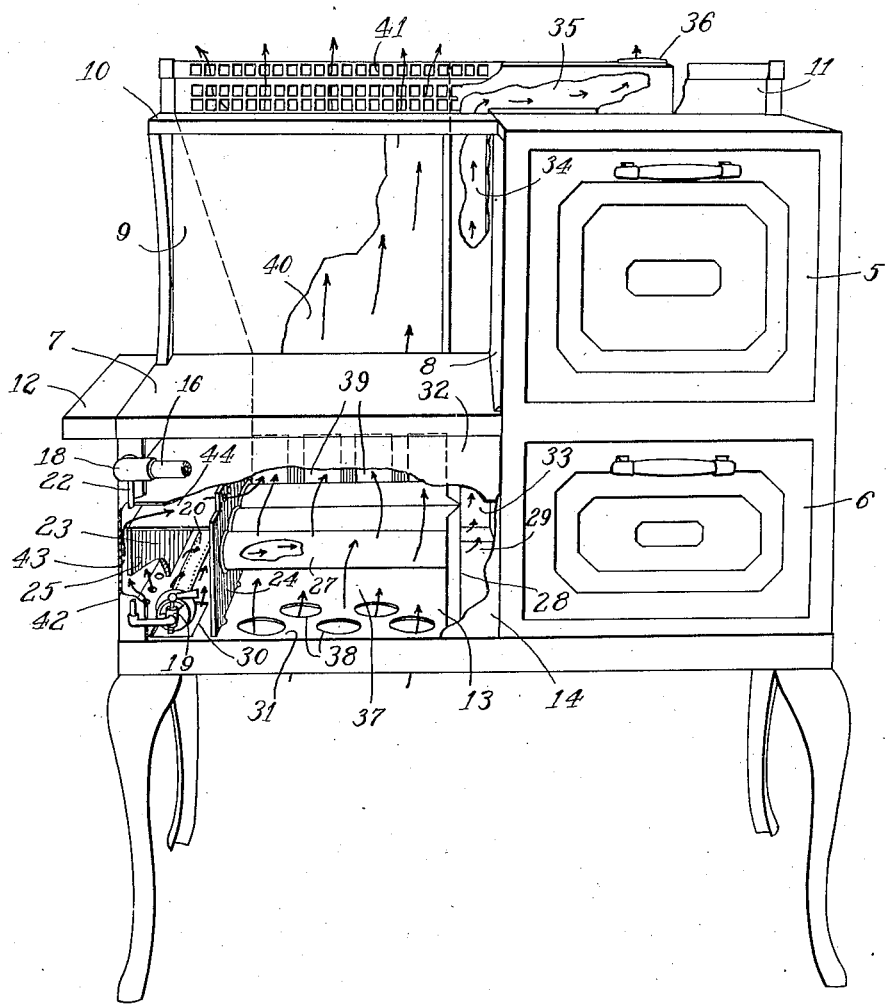
Figure 1 is a front view somewhat in perspective of a gas stove incorporating the heater feature in accordance with my invention.

The stove to which the present improvements are illustrated as applied will be seen to be of the conventional double oven cabinet type having the baking oven 5 and broiler oven 6 at one side of the cooking top 7. The side 8 of the oven 5 forms a side splasher wall. A rear splasher wall 9 is also provided having the usual splasher or top shelf 10 and back guard 11. The end shelf 12 for the cooking top 7 may or may not be provided as desired and is often left off where the limited space in a kitchen so requires. According to the present invention, a heater is installed within what is generally known as the storage compartment 13 beneath the cooking top. By virtue of this arrangement, the stove is made no larger than usual and at the same time the neat and ornamental appearance of the stove front is preserved. The appearance is enhanced by the provision of a panel 14 closing the front of the storage compartment and resembling the doors of the ovens 5 and 6.

The burners of the cooking top 7 disposed beneath the top in the usual secondary air chamber are supplied with gas in the usual manner through cocks 15 on the manifold 16. The latter is supported at one end by a bracket (not shown) and at the other end on an elbow 18 joined with a service pipe extending forwardly from the back of the stove. A cock 19 supplies gas to a heater burner 20 in the compartment 13 which may be lit through an opening in the panel 14 as indicated in Fig. 1. The burner cock 19 is joined by a pipe 22 preferably with the elbow 18 previously mentioned. It will be seen that the heater connections are quite simple and inexpensive. The arrangement is actually adapted for the application of the heater to the ordinary stove in service.

The burner 20 is of elongated form and extends the depth of the compartment 13, as seen in Fig. 2. It is disposed within a burner box section 23 in the storage compartment. The box 23 has the sides thereof formed by a pair of cast plates 24 and 25. The plate 24 is formed with a plurality of flanged necks 26 each supporting one end of a flue 27 the other ends of which are welded or otherwise suitably secured to a partition 28 defining the manifold 29 at the far end of the compartment 13. The flues 27 and partition wall 28 are of relatively thin sheet metal for the purpose of readily dissipating the heat of the combustion products to the air circulating past the same.

The joints at all points are made tight to avoid mixing the products of combustion with the fresh air. The secondary air for the burner 20 is supplied through a plurality of openings 30 in the bottom wall 31 of the compartment 13. The plate 24 and partition 28 are fastened between the bottom wall 31 and a top wall 32 while the plate 25 extends upwardly a bit short of the top wall but extends like the other walls referred to from front to back of the compartment 13. The manifold 29 discharges through an opening 33 into a flue 34 extending up the back wall 9. This flue, as illustrated in Fig. 1, has connection through a duct 35 with the flue collar 36 which conducts away the waste products of combustion from the oven burners for the ovens 5 and 6. The circuit of secondary air and the products of combustion are shown by the arrows in Fig. 3. The air entering the burner box 23 through the openings 30 in the bottom wall 31 of the compartment 13 is, of course, oxygen-laden to sustain the gas flame of the burner 20. The products of combustion travel across the entire width of the compartment 13 through the flues 27 into the manifold 29. From here the products are conducted through the opening 33 up across the back wall 9 in the flue 34 and out through the chimney by way of the duct 35 and flue collar 36. There is no way for any of the waste products of combustion to escape into the room. The absolute freedom from fumes is a particular appeal which the heater feature offers, aside, of course, from the efficient heating and the other advantages derived.

The air heater compartment 37 formed between the manifold 29 and the burner box 23 has a plurality of openings 38 in the bottom wall 31 cross-wise of the front of the compartment so as to avoid any possible restriction to the influx of cold, fresh air to be heated. The air travels rearwardly over and about all of the hot flues 27, which are kept practically constantly at a red heat, and issues through the number of outlet openings 39 in the back wall 9. An ample sized warm air conduit 40 conducts the air leaving the openings 39 upwardly across the back wall 9 to the upper end thereof where a register 41 is provided in the back guard wall 11 over the top shelf 10. There is substantially no restriction whatever to the flow of fresh air from the time that it enters the openings 38 until it leaves by way of the register 41. The passage of air in the manner indicated, in through the bottom of the stove and out at the top, induces a circulation of air in the room and experiment has shown that a comfortable warmth is experienced at a substantial distance from the stove practically the moment the heater is turned on. At the same time, there is absolutely no fire hazard in the operation of the heater and no possibility of scorching the clothing when standing near the stove. This latter objection is particularly noticeable in certain other types of gas heaters proposed for a similar purpose. The radiant type of heater is particularly subject to this objection. The passing of the waste products of combustion upwardly across the rear of the back wall 9 and a similar course for the heated air results in the back wall 9 being kept quite hot and a substantial amount of radiation from the large surface afforded increases the heating efficiency.

It will be noted that the plate 25 is spaced from the outside wall 42 of the compartment 13 affording a passage 43 therebetween through which cold, fresh air is arranged to pass upwardly through openings in the bottom wall 31. A top wall 44 is provided for the burner box 23 between the plates 24 and 25 leaving a by pass 45 between the passage 43 and section 37 for the passage of the auxiliary air circulating about the wall 25. The purpose primarily in this provision is to avoid letting the wall 42 get too hot where it would become a hazard particularly in the case of children or might otherwise scorch the clothing or be objectionable in some other way. The auxiliary air delivers the heat from the wall 25 by entraining with the air passing over the flues 27, the course of which was described above.

It is believed that the foregoing description conveys a clear and complete understanding of the present invention and of all of its objects and attendant advantages. It should, however, be understood that, while the specification has made reference to a specific embodiment of the invention, other modifications and adaptations thereof will at once appear to anyone skilled in the art to which the invention relates. Such modifications and adaptations it is intended shall be included within the spirit and scope of the appended claims.

I claim:

1. In a stove comprising a cooking top having a compartment therebeneath and a back splasher wall thereabove, a heater unit in said compartment including air heating pipes extending substantially from one end of the compartment to the other approximately parallel with the stove front, fresh, cold air inlets at the front and bottom of said compartment substantially the width thereof, warm air outlets at the back and top of said compartment substantially the width thereof, and a warm air conduit substantially the width of said compartment extending from said outlets and having delivery openings for directing the warm air from the stove.

2. In a stove of the character described comprising a heater compartment, a burner at one side of said compartment, flues extending cross-wise of said compartment for conducting the products of combustion from said burner, a manifold at the other side of said compartment communicating with said flues and having communication with a chimney for conducting away the products of combustion, and fresh air inlets and outlets on opposite sides of said flues at opposite sides of said compartment.

3. In a stove of the character described, comprising a heater compartment, a burner in said compartment at one side thereof in a section separated from the remainder of the compartment, a plurality of flues communicating with said section and extending cross-wise of said compartment for conducting the products of combustion from said burner, a manifold at the other side of said compartment communicating with said flues and having communication with a chimney for conducting away the products of combustion, fresh air inlets at the front of said compartment, warm air outlets at the rear of said compartment, and a conduit communicating with said outlets and arranged to deliver the heated air from the stove.

4. In a stove of the character described, comprising a cooking top having a heater compartment therebeneath and a back splasher wall thereabove, a burner in said compartment in a closed section at one side of said compartment, a plurality of flues communicating with said section extending cross-wise of said compartment for conducting the products of combustion from said burner, a closed manifold section at the opposite side of said compartment communicating with said flues, a flue duct communicating with said manifold extending up the rear of said back wall and leading to a chimney for conducting away the products of combustion, fresh air inlets in the bottom of said compartment between said sections, warm air outlets at the back of said compartment, and a warm air conduit communicating with said outlets extending up the rear of said back wall alongside said flue duct and having delivery openings for directing the heated air from the stove.

5. In a stove of the character described, comprising a heater compartment, a burner, a box therefor, flues extending cross-wise of said compartment communicating with said burner box for conducting the products of combustion from said burner across one dimension of said compartment, a manifold for receiving the products of combustion from said flues and delivering the same to a chimney, and fresh air inlets and outlets in said compartment arranged to cause air to pass along another dimension of the compartment cross-wise of the flues.

6. In a stove of the character described, comprising a heater compartment, a burner, a box therefor within said compartment and spaced from the adjacent side wall thereof, flues extending cross-wise of said compartment communicating with said burner box for conducting the products of combustion from said burner from one side to the other side of said compartment, a manifold for receiving the products of combustion from said flues and delivering the same to a chimney, forwardly and rearwardly located fresh air inlets and outlets in said compartment for causing a cross draft of air on the flues, and fresh air inlets for the space between said burner box and the side wall of said compartment.

7. A combined heater and cook stove comprising in combination with a stove having oven compartments at one side, a cooking top at the other side, the burners of the latter being provided in a secondary air chamber beneath the same, and a storage compartment underlying the secondary air chamber of the cooking top, of a gas-burning air heater installed entirely within and substantially filling said storage compartment.

8. A combined heater and cooking stove comprising in combination with a stove having a cooking top, the burners of the latter being provided in a secondary air chamber therebeneath, and a storage compartment beneath the same, of a heater installed entirely within the storage compartment having a bottom inlet for fresh cold air at the front of said compartment and a top outlet at the back of said compartment for delivering the heated air from the stove.

9. A combined heater and cooking stove comprising a cooking top, the burners of said top being disposed in a secondary air chamber therebeneath, a compartment underlying the secondary air chamber, said compartment having a back wall in common with the cooking top and secondary air chamber, a heater installed entirely within said compartment, said compartment having inlets for the admission of air to be heated and having outlets in the back wall for the discharge of the heated air, and a warm air conduit extending up the rear of the back wall having communication with said outlets, there being forwardly exposed warm air register openings in the back wall above the cooking top communicating with the discharge end of the warm air conduit for delivering the heated air forwardly from the stove.

10. In a stove of the character described comprising a heater compartment, a burner box in one side of said compartment having a burner therein, a manifold for products of combustion in the diametrically opposite side of the compartment, flues extending cross-wise of said compartment and communicating at their opposite ends with the burner box and manifold, means for supplying primary and secondary air to the burner in the burner box, inlet and outlet openings leading into and out of the compartment and causing a cross-draft of air across the flues in said compartment whereby to insure efficient exchange of heat from the flues to the air, a warm air conduit communicating with said outlets for delivering the heated air from the stove, and a flue duct communicating with the manifold for conducting the products of combustion therefrom, the flue duct being in heat transferring relation to the warm air conduit.

11. In a stove as set forth in claim 10 wherein the burner box is disposed in spaced relation to the adjacent side wall of the compartment, the provision of inlet openings communicating with the space between the box and the wall to admit air to take up the heat from the walls of the burner box, said space being in communication with the warm air conduit.

12. In a stove comprising a cooking top having a compartment therebeneath, a heater unit in said compartment including air heating pipes extending substantially from one end of the compartment to the other approximately parallel with the stove front, and cold air inlets and warm air outlets for said compartment, each being disposed substantially the width thereof to afford access for the cold air to the full length of the air heating pipes for efficient heating, the inlets being provided at the bottom of the compartment at one side of the pipes, and the outlets being provided at the top of the compartment at the other side of the pipes.

13. A combined heater and cook stove comprising in combination with a stove having oven compartments at one side, a cooking top at the other side, the burners of the latter being provided in a secondary air chamber beneath the same, and a storage compartment underlying the secondary air chamber of the cooking top, of a heater installed entirely within said storage compartment, said compartment having a fresh air inlet at the front thereof and a warm air outlet at the back thereof whereby to afford cross-draft of the air to be heated relative to the heater in said compartment.

14. A combined heater and cooking stove comprising in combination with a stove having a cooking top, the burners of the latter being provided in a secondary air chamber therebeneath, and a storage compartment beneath the same, of a heater installed entirely within the storage compartment, said compartment having air inlet and outlet openings so located as to afford a substantially cross-draft of the air to be heated relative to the heater in said compartment.

In witness of the foregoing I affix my signature.

PETER I. HOLLMAN.